UNITED STATES PATENT OFFICE 3,542,896
Patented Nov. 24, 1970

3,542,896
OLEFIN ISOMERIZATION PROCESS
Walter A. Butte, Jr., West Chester, Pa., assignor to Sun Oil Company, Philadelphia, Pa., a corporation of New Jersey
No Drawing. Original application Dec. 21, 1967, Ser. No. 692,288. Divided and this application Aug. 22, 1969, Ser. No. 870,737
Int. Cl. C07c 5/22
U.S. Cl. 260—683.2                  4 Claims

ABSTRACT OF THE DISCLOSURE

New catalysts useful for the dimerization, isomerization and hydrogenation of olefins such as aliphatic monoolefins and diolefins are formed by admixing, in the presence of a mutual solvent, a hydrocarbyl lithium compound of the formula LiR, wherein R is a hydrocarbon radical having 1–30 carbon atoms selected from the group consisting of alkyl and cycloalkyl, with a cobalt acetylacetonate of the formula $Co[CH\text{---}(COCH_3)_2]_n$, wherein $n$ has a value of 2 or 3.

CROSS REFERENCE TO RELATED APPLICATION

This is a division of application Ser. No. 692,288, filed Dec. 21, 1967.

BACKGROUND OF THE INVENTION

The dimerization of ethylene employing a catalyst system consisting of a mixture of cobalt compounds and organo-aluminum compounds is disclosed in Chemistry and Industry of Jan. 30, 1965, p. 223. As cobalt compounds, cobalt (III) acetylacetonate, cobalt (II) acetylacetonate, and cobalt (II) acetate can be used. Among the effective organo-aluminum compounds are triethylaluminum, diisobutylaluminum hydride, ethoxydiethylalumimum, and sodium tetraethylaluminate. The catalyst is prepared by mixing both components in an appropriate solvent under nitrogen or ethylene atmosphere. Isomerization of butene-1 to butene-2 was noted.

The present invention is based, among other things, upon the discovery that LiR compounds can be used advantageously with selected cobalt compounds, to the exclusion of organo-aluminum compounds.

The catalysts of the invention are highly selective, minimizing side reactions such as skeletal isomerization, cracking and polymerization. Being soluble, they are not subject to deactivation by deposition of solids.

SUMMARY OF THE INVENTION

The invention resides in new catalyst complexes resulting from the admixture in a mutual solvent of a hydrocarbyl lithium compound of the formula LiR, wherein R is a hydrocarbyl radical having 1–30 carbon atoms selected from the group consisting of alkyl and cycloalkyl, with a cobalt acetylacetonate of the formula $$Co[CH\text{---}(COCH_3)_2]_n$$

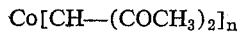

wherein $n$ has a value of 2 or 3.

The invention also resides in the use of the foregoing new catalysts in the dimerization, isomerization and hydrogenation of olefins such as aliphatic monoolefins and diolefins dimerization being very largely confined to ethylene, and to $C_4$ to $C_6$ diolefins, e.g., butadiene and its simple homologues, such as isoprene, piperylene and 2,3-dimethylbutadiene.

Catalyst activity is improved when the above-mentioned admixture of catalyst components takes place in the presence of an olefin, e.g., ethylene. In any case, for best results, air and certain of its normal components, e.g., oxygen and moisture are excluded.

The mutual solvent for catalyst component admixture purposes can be the olefin or diolefin to be treated for dimerization, isomerization and/or hydrogenation purposes. Good practice dictates that other solvents ought to be inert for practical purposes in the reaction zone, benzene, toluene, xylene, hexane, cyclohexane and the like including mixtures thereof being examples.

While considerable latitude is available in the atomic ratio of lithium to cobalt in the catalyst complex, particularly in the case of isomerization, for good practical purposes this ratio ought to be held to from 4–7, preferably 5–7, e.g., 6.0 or thereabouts, when $n$ is 3, and from 3–5, preferably 4 or thereabouts, when $n$ is 2.

The following are examples of suitable R groups for the LiR component of the catalyst complex: ethyl, propyl, isopropyl, n-butyl, isobutyl, tertiary butyl, n-amyl, isoamyl, n- or isoctyl, n- or isodecyl, lauryl, cyclopentyl, methylcyclohexyl and the like. Preferably, LiR is an alkyl lithium in which the alkyl group has 2–10 carbon atoms.

Temperature conditions during reaction in the formation of the catalyst complex and/or in its use are not particularly critical, but ought to be high enough for the reaction to take place at a reasonable rate, and not so high as to cause unwanted decomposition. Temperatures at 0° C. and 30° C. were found quite suitable, whereas at —80° C. reaction was very slow. A good practical range is 0–60° C. At much higher temperatures the catalyst tends to decompose.

When using the catalyst complex, pressures on normally gaseous reactants, or on reactants gaseous under the temperature conditions of reaction, are normally made sufficiently high for the reaction to take place at a reasonable rate, and normally are not so high as to incur unnecessary inconvenience or hazard. For example, when dimerizing ethylene, pressures in the range of 0.1 to 100 atmospheres, and particularly 1 to 20 atmospheres can be used, and when hydrogenating comparable pressures can be employed. In the case of isomerization, similar conditions can be employed. In any case, sufficient pressure is employed to have the reactant or reactants present in liquid phase during reaction.

Products resulting from dimerization, isomerization and hydrogenation reactions carried out in accordance with the invention find utility in well-known manner, and, for purposes of illustration, as follows.

(1) Ethylene is dimerized to n-butene (a mixture of 1 and 2 n-butenes) which finds use in the alkylation of isobutane in the production of motor fuels.

(2) 2-Methylbutene-1 is isomerized to 2-methylbutene-2 which is preferred for isoprene synthesis.

(3) Lube stocks containing olefins are subjected to hydrogenation to increase stability.

DESCRIPTION OF THE PREFERRED EMBODIMENTS

Catalyst preparation

Upon admixing butyl lithium and cobalt (III) acetylacetonate in benzene solution under nitrogen, and in atomic ratios Li:Co(III) ranging from 4 to 7, a dark brown mixture was formed, and a hydrocarbon gas was evolved. The catalyst system formed was a combination or complex of the reactants. High catalytic activity for dimerization and hydrogenation reactions was observed over the above range of atomic ratios, with ratios of Li:Co(III) of about 5–7 being outstanding.

The catalyst system was several times more active when the cobalt and lithium containing reagents were admixed in the presence of ethylene over the above atomic ratio range of from 4 to 7, particularly high catalytic activity for dimerization and hydrogenation reactions again being observed over the range of atomic ratios Li:Co(III) of about 5–7.

The atomic ratio of Li:Co is not particularly critical in the case of isomerization reactions, the reacion rate being quite fast, indicating that the rate limiting step is somewhat a function of diffusion of the olefin into the catalyst complex. As an example, high reaction rates were observed with atomic ratios of Li:Co(III) ranging over 2–6.

Upon admixing butyl lithium and cobalt (II) acetylacetonate under the above conditions, the resulting catalyst system exhibits similar characteristics, except that for dimerization and hydrogenation reactions, the atomic ratio range of high catalytic activity is Li:Co(II) of 3–5. This ratio range is less critical in the case of isomerization, the reacton rate again being quite fast.

Similar results are obtained when other LiR compounds of the invention are substituted for butyl lithium.

The following examples illustrate the preparation of the catalyst complexes of the invention.

EXAMPLE 1

A preformed catalyst complex for use in dimerization, isomerization and hydrogenation reactions was made by introducing a 20 ml. portion of a .075 molar solution of cobalt (III) acetylacetonate in toluene into a flask under nitrogen. To this solution were added 5.5 ml. of a 1.63 molar solution of butyl lithium in hexane. A deep brown solution was formed comprised of the catalyst complex, useful for the various purposes set forth herein.

EXAMPLE 2

A catalyst complex for use in the dimerization of ethylene was made by introducing a 20 ml. portion of a .075 molar solution of cobalt (III) acetylacetonate in benzene into a flask under ethylene at 10 p.s.i.g. To this solution were added 5.5 ml. of a 1.63 molar solution of butyl lithium in hexane. A deep brown solution was formed comprised of the catalyst complex.

EXAMPLE 3

A catalyst complex for use in the dimerization of ethylene was made by introducing a 20 ml. portion of a .075 molar solution of cobalt (II) acetylacetonate in benzene into a flask under ethylene at 10 p.s.i.g. To this solution were added 3.7 ml. of a 1.63 molar solution of butyl lithium in hexane. A deep brown solution was formed comprised of the catalyst complex.

EXAMPLE 4

A catalyst complex for use in dimerization, isomerization and hydrogenation reactions was made by introducing a 20 ml. portion of a .075 molar solution of cobalt (II) acetylacetonate in a suitable solvent, e.g., benzene or toluene, into a flask under nitrogen. To this solution were added 3.7 ml. of a 1.63 molar solution of butyl lithium in hexane. The solution formed comprised the catalyst complex.

EXAMPLE 5

A catalyst complex was prepared in situ under an atmosphere of hydrogen by adding 6.8 ml. of benzene, to 2.7 ml. of a .37 molar solution of cobalt (III) acetylacetonate in benzene, 10.5 ml. of 2-methylbutene-1, and 3.7 ml. of 1.6 molar butyl lithium in hexane in that order to a flask. A dark brown solution formed which began to absorb hydrogen rapidly.

Any other LiR compound as hereinbefore specified can be substituted in the above examples for the butyl lithium employed.

Dimerization

The data of Table I are the result of runs made with a series of preformed catalyst complexes in benzene as solvent, the atomic ratio of lithium to cobalt (III) in the complexes varying as shown. The lithium compound was butyl lithium. The concentration of catalyst complex in its solution in benzene was approximately .06 molar. A good general range is from .01 to .1 molar. After formation of the complex, which took place in a closed container in a nitrogen atmosphere, ethylene was passed into the solution, whereupon a mixture of normal butenes was formed with practically complete exclusion of higher oligomers. The runs were carried out at 30° C. for a period of 120 minutes under an ethylene pressure of 50 p.s.i.g.

TABLE I

| Atomic ratio Li:Co(III) | $C_4H_8$, moles/gram atom Co |
|---|---|
| 4.0 | 5 |
| 5.0 | 20 |
| 6.0 | 32 |
| 6.6 | 62 |
| 7.0 | 6 |

The data of Table I clearly demonstrate high catalytic activity in the atomic ratio range of Li:Co of 4–7 in dimerization reactions.

The data of Table II are the result of runs made with a series of catalyst complexes prepared from butyl lithium and cobalt (III) acetylacetonate in benzene as solvent, and in the presence of ethylene at 10 p.s.i.g. Ethylene was thereafter passed into the solution for 240 minutes at 30° C., and under a pressure of 50 p.s.i.g. A mixture of normal butenes was formed, with the practically complete exclusion of higher oligomers. The concentration of catalyst in benzene at the beginning of each run was approximately .05 molar. Increased activity of the catalyst when prepared in the presence of ethylene is clearly demonstrated, as is high catalytic activity in the atomic ratio range of Li:Co(III) of 4–7 in dimerization reactions.

TABLE II

| Atomic ratio Li:Co(III) | $C_4H_8$, moles/gram atom Co |
|---|---|
| 3.0 | 4 |
| 4.0 | 17 |
| 5.0 | 66 |
| 5.5 | 79 |
| 5.9 | 93 |
| 6.0 | 107 |
| 6.1 | 115 |
| 6.7 | 72 |
| 7.0 | 11 |
| 9.0 | 16 |

Other hydrocarbon solvents can be substituted for benzene, although some change in yield may be experienced, e.g., the yields with toluene and cyclohexane, respectively, were somewhat lower, but nevertheless practical.

A gradual decrease of catalytic activity was observed during the course of several hours. This rate decline was accompanied by the formation of an insoluble black solid. However, it was observed that catalyst upon becoming inactive could be regenerated by the addition of more LiR.

The runs of Table III were made with preformed catalyst complexes made in benzene and under nitrogen between butyl lithium and cobalt (II) acetylacetonate. Thereafter, ethylene was passed into the solution at 30° C. for 120 minutes, and under a pressure of 50 p.s.i.g. A mixture of butenes was formed to the practical exclusion of higher oligomers. The concentration of catalyst in benzene at the beginning of each run was approximately .05 molar. These data show high catalyst activity between atomic ratios of Li:Co(II) of 3 to 5.

TABLE III

Atomic ratio Li:Co(II):    $C_4H_8$, moles/gram atom Co
3 ---------------------------------------- 10
4 ---------------------------------------- 38
5 ---------------------------------------- 14

Dimerization of butadiene-1,3 is demonstrated in the following example.

EXAMPLE IV

Into a solution of catalyst complex in benzene prepared as in Example I, and in which complex the atomic ratio of lithium to cobalt (III) was 6.0, was fed butadiene-1,3 at a temperature of 30° C. and a pressure of 50 p.s.i.g. for 120 minutes. The product consisted of a mixture in which 3-methyl-1,4,6-heptatriene heavily predominated. This material is a valuable component in preparation of ethylene-propylene terpolymer.

Recovery of dimer product from the respective reaction masses of the above runs was accomplished in a conventional manner, e.g., by adding water or a monohydric aliphatic alcohol to the reaction mass to kill the catalyst, followed by filtering to remove any solids, and then distillation to remove solvent and the dimer product.

Isomerization

As brought out above, the new catalysts of the invention also include double bond isomerization of olefins, and unlike many other catalyst systems, these new catalysts promote such double bond migration with the virtually complete exclusion of skeletal isomerization, polymerization and/or cracking.

The isomerization of 1-olefins proceeds with an exceptionally high rate. Because of this high activity, the effect of catalyst composition is less pronounced than in the case of dimerization. Nevertheless, outstandingly high activity is still discernible within the Li:Co ratio ranges set forth above for dimerization reactions.

Other unusual features of catalyst selectivity are present.

As will be seen from the following, Tables IV and V, the isomerization of higher normal 1-olefins proceeds in a stepwise manner, but does not rapidly reach equilibrium. Instead, 2-olefin (cis and trans) accumulates, 3-olefin (in the case of $C_8$ and higher olefins) being formed much more slowly, since the 2-olefin is far less reactive under reaction conditions than the terminal olefin. Moreover, the 2-olefin is formed with a cis selectivity somewhat greater than that of the equilibrium value during early stages of the reaction.

Some 3-olefin is formed (where possible) early in the reaction, but further isomerization of 2-olefin proceeds only slowly. Apparently, the 3-olefin is formed directly from the 1-olefin more rapidly than from the 2-olefin.

Isomerization of 3-olefin (where possible) is extremely slow, except at high temperatures.

In the following Table IV is illustrated the isomerization of heptene-1 over a range of atomic ratios Li:Co(III) of 4–8. The reactions were carried out at ambient (room) temperature, and over variable periods of time, as shown. The lithium compound was butyl lithium.

TABLE IV

| Li=Co(III) | Time, min. | Product composition | | | | Percent reacted | Cis/trans |
|---|---|---|---|---|---|---|---|
| | | 1-olefin | Cis-2-olefin | Trans-2-olefin | 3-olefin | | |
| 4 | 15 | 33 | 20 | 47 | | 67 | .43 |
| 6 | 15 | 20 | 22 | 46 | 12 | 80 | .48 |
| 8 | 15 | 64 | 12 | 24 | | 36 | .50 |
| 6 | 60 | 5 | 27 | 54 | 14 | 95 | .50 |
| 6 | 180 | 4 | 26 | 54 | 16 | 96 | .48 |

The data of Table V on the isomerization of heptene-1 were obtained with a catalyst complex prepared with an atomic ratio of Li:Co(III) of 6. The reactions were carried out at ambient (room) temperature, and over variable periods of time as shown. The lithium compound was butyl lithium.

TABLE V

| Time, min. | Product composition | | | | Percent reacted | Cis/trans |
|---|---|---|---|---|---|---|
| | 1-olefin | Cis-2-olefin | Trans-2-olefin | 3-olefin | | |
| 15 | 10 | 22 | 52 | 16 | 90 | .42 |
| 35 | 5 | 22 | 56 | 16 | 95 | .39 |
| 60 | 0 | 22 | 59 | 19 | 100 | .37 |
| 240 | 0 | 17 | 53 | 30 | 100 | .32 |
| 1,320 | 0 | 11 | 52 | 37 | 100 | .21 |

The presence of an alkyl group or groups on vinylic carbon atoms inhibits the rate of reaction, as shown in Table VI. This apparently is a cause for the accumulation of normal 2-olefins formed during the isomerization of normal 1-olefins. Also note that the isomerization of 2-methylpentene-1 is considerably slower than that of hexene-1.

On the other hand, it is to be noted that the presence of an alkyl group on a carbon atom which is not included in the double bond has a minor effect on the reaction rate, as, for example, in the case of 4-methylpentene-1.

TABLE VI

| Olefin | Relative reactivity | Principle product |
|---|---|---|
| Hexene-1 | 10 | Hexene-2. |
| Hexene-2 | 1 | Hexene-3. |
| 2-methylpentene-1 | 5 | 2-methylpentene-2. |
| 4-methylpentene-1 | 9 | 4-methylpentene-2. |

High catalyst selectivity of this type finds use for isomerizing selected olefins to yield predominantly one product, or for isomerizing selectively or predominantly a certain component or components present in olefin mixtures.

Hydrogenation

The catalyst complexes of the invention also catalyze the hydrogenation of olefins. The complexes are soluble in hydrocarbons, and the substrate itself, if liquid, can serve as a solvent. On the other hand, any of the usual paraffinic or aromatic hydrocarbon solvents can be employed whether the substrate is solid or liquid.

In fact, the catalyst complexes of the invention, in solution, can be employed for the hydrogenation of macromolecular, colloidal or insoluble substrates.

These catalyst complexes are so active that hydrogenations can be conducted at a useful rate even under ordinary conditions of temperature and pressure as illustrated in Table VII. In carrying out these reactions, 0.10 mole of olefin was contacted with $5 \times 10^{-4}$ mole cobalt (III) acetylacetonate and $3 \times 10^{-3}$ mole of butyl lithium at 30° C. under one atmosphere of hydrogen. The Li:Co atomic ratio was 6.

TABLE VII

| Olefin | Time, min. | Product composition | | |
|---|---|---|---|---|
| | | 1-olefin | 2(3)-olefin | Paraffin |
| Heptene-1 and -3 (equimolecular) | 10 | 4 | 57 | 39 |
| | 30 | 0 | 55 | 45 |
| | 60 | 0 | 47 | 53 |
| | 120 | 0 | 37 | 63 |
| Octene-2 | 10 | 2 | 88 | 10 |
| | 60 | 0 | 58 | 42 |
| | 120 | 0 | 42 | 58 |
| 2-methyl-butene-1 | 10 | 61 | 24 | 15 |
| | 30 | 52 | 33 | 15 |
| | 60 | 37 | 42 | 21 |

Olefin structure, as will be seen from the above Table VII, greatly influences the rate of hydrogenation. The most reactive olefins are those with the smallest number of alkyl groups substituted on the carbon atoms containing the unsaturated linkage. Thus heptene-1 is considerably more reactive than heptene-2, octene-2, heptene-3 and 2-methylbutene-1 and -2.

The data of Table VII show that the isomerizing activity of the catalyst is retained in the presence of hydrogen, for 1-olefins are converted to 2-olefins in a competitive process, the end product, nevertheless, being the corresponding paraffin.

The effect of the atomic ratio of Li:Co upon catalytic activity is shown by the data of Table VIII. In carrying out these reactions, 0.10 mole of olefin and $5 \times 10^{-4}$ mole of cobalt (III) acetylacetonate in admixture with butyl lithium in the atomic ratios shown were contacted for 30 minutes at 30° C. with hydrogen under 30 p.s.i.g. The olefin was heptene-1.

TABLE VIII

| Li:Co(III) atomic ratio | Product composition | | |
|---|---|---|---|
| | 1-olefin | 2(3)-olefin | Paraffin |
| 3 | 47 | 46 | 7 |
| 5 | 0 | 32 | 68 |
| 6 | 0 | 19 | 81 |
| 7 | 0 | 33 | 67 |

As with the dimerization and isomerization activity of the catalyst complex when comprised of hydrocarbyl lithium and cobalt (III) acetylacetonate, superior hydrogenation activity is observed in the range of atomic ratios of Li:Co(III) of 4–7, and particularly at or about 6. In the case of cobalt (II) acetylacetonate, the range is 3–5, with particularly high activity at or about 4.

The rate of hydrogenation increases as temperature and/or pressure is elevated. The influence of pressure can be seen upon comparison of the data of Table VII above with that of Table IX below. In carrying out the reactions of Table IX, 0.10 mole of olefin, $5 \times 10^{-4}$ mole of cobalt (III) acetylacetonate, and $3 \times 10^{-3}$ mole of butyl lithium were contacted at 30° C. for 10 minutes under hydrogen pressure of 30 p.s.i.g.

TABLE IX

| Olefin | Product composition | | |
|---|---|---|---|
| | 1-olefin | 2(3)-olefin | Paraffin |
| Heptene-1 and -3 (equimolecular) | 0 | 41 | 59 |
| Octene-2 | 0 | 56 | 44 |
| 2-methylbutene-1 | 35 | 38 | 27 |

Heptene-1 and -3, and octene-2 were completely hydrogenated after 30 minutes, and 2-methylbutene-1 was completely hydrogenated after 120 minutes.

All reactions hereunder and to which this invention relates are usually conducted at as low a temperature as is consistent with an acceptable rate, and preferably in the range 0–60° C. At much higher temperatures there is a tendency for the catalyst to decompose.

While low hydrogen pressures are normally more convenient, higher pressures can be used to provide accelerated rates.

The catalysts of the invention are sensitive to atmospheric air, water, and hydroxylic solvents, and it therefore is highly preferred that these materials be rigorously excluded.

Similar data and results are obtained when other hydrocarbyl lithium compounds are substituted for those employed in obtaining the data of the above tables and examples.

Also cobalt (III) and cobalt (II) acetylacetonates can be used interchangeably in the above examples, attention being given to the preferred atomic ratio ranges set forth above, and in obtaining data comparable to the data of the above tables.

Likewise other monoolefins and diolefins can be substituted.

I claim:

1. Process for the double bond isomerization of olefins which comprises contacting a monoolefin having at least four carbon atoms at an isomerization temperature with a catalyst system obtained by admixing (a) a hydrocarbyl lithium compound of the formula LiR wherein R is an alkyl or cycloalkyl radical having 1–30 carbon atoms, with (b) a cobalt acetylacetonate of the formula

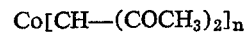

wherein $n$ has a value of 2 or 3, and recovering an isomerization product containing at least one isomer of the starting monoolefin.

2. Process according to claim 1 wherein the starting monoolefin is a 1-olefin.

3. Process according to claim 1 wherein $n$ has a value of 2 and components (a) and (b) have been admixed in a proportion such that the resulting atomic ratio of Li:Co is in the range of 3–5.

4. Process according to claim 1 wherein $n$ has a value of 3 and components (a) and (b) have been admixed in a proportion such that the resulting atomic ratio of Li:Co is in the range of 4–7.

References Cited

UNITED STATES PATENTS

| 3,364,278 | 1/1968 | Reusser | 260—683.15 |
| 3,393,245 | 7/1968 | Zuech | 260—680 X |

FOREIGN PATENTS

| 1,002,721 | 8/1965 | Great Britain. |

DELBERT E. GANTZ, Primary Examiner

V. O'KEEFE, Assistant Examiner

U.S. Cl. X.R.

260—683.15, 680